(12) United States Patent
Sowa et al.

(10) Patent No.: US 12,611,957 B2
(45) Date of Patent: Apr. 28, 2026

(54) METHOD OF CONTROLLING OF BATTERY ENERGY STORAGE SYSTEM OF POWER SYSTEM WITH HIGH DYNAMIC LOADS

(71) Applicant: ABB Schweiz AG, Baden (CH)

(72) Inventors: Kacper Sowa, Barcice (PL); Adam Ruszczyk, Cracow (PL); Tomasz Kuczek, Cracow (PL); Carlos Nieto, Rae vald (EE)

(73) Assignee: ABB Schweiz AG, Baden (CH)

( * ) Notice: Subject to any disclaimer, the term of this patent is extended or adjusted under 35 U.S.C. 154(b) by 651 days.

(21) Appl. No.: 18/185,469

(22) Filed: Mar. 17, 2023

(65) Prior Publication Data

US 2023/0294544 A1 Sep. 21, 2023

(30) Foreign Application Priority Data

Mar. 18, 2022 (EP) ..................................... 22163112

(51) Int. Cl.
*G06F 3/048* (2013.01)
*B60L 53/66* (2019.01)
(Continued)

(52) U.S. Cl.
CPC .............. *B60L 53/66* (2019.02); *H02J 3/003* (2020.01); *H02J 3/004* (2020.01); *H02J 7/0048* (2020.01)

(58) Field of Classification Search
CPC . B60L 53/66; H02J 3/003; H02J 3/004; H02J 7/0048; H02J 3/48; H02J 13/00004; H02J 3/32; H02J 2207/20; Y02E 40/10
See application file for complete search history.

(56) References Cited

U.S. PATENT DOCUMENTS 9,618,914 B2 4/2017 Zhang et al.
9,954,368 B2 4/2018 Kang
(Continued)

FOREIGN PATENT DOCUMENTS

WO WO 2017/062919 A1 4/2017

OTHER PUBLICATIONS

Zhuo, Wenhau (Control Strategies for Microgrids with Renewable Energy Generation and Battery Energy Storage Systems), attached as pdf (Year: 2019).*

*Primary Examiner* — Aleksey Olshannikov
(74) *Attorney, Agent, or Firm* — Fitch Even Tabin & Flannery LLP

(57) ABSTRACT

A method of controlling battery energy storage comprises a renewable active power source ($P_R$), a battery energy storage system (BESS), at least one static load ($P_{Load}$) and at least one high dynamic load $P_{HLOAD}$. Active power demand of the system in the point of common coupling is at quasi-constant level. The method further includes gathering constant active power limit from the external grid ($P_{GRID}$) and historical data of active power profiles of: predicting the following active power profiles for day+1, calculating required active power of the battery energy storage system, setting daily peak of state of charge and minimum state of charge of the battery energy storage system, and verifying whether daily peak of state of charge and minimum state of charge ensure that instantaneous values of state of charge through the entire day of the battery energy storage system is within range of 20% to 80%.

9 Claims, 4 Drawing Sheets

(51) Int. Cl.
H02J 3/00 (2006.01)
H02J 7/00 (2006.01)

(56) References Cited

U.S. PATENT DOCUMENTS

| | | | | |
|---|---|---|---|---|
| 11,532,943 B1 * | 12/2022 | Zauli | ......................... | H02J 3/32 |
| 2016/0233699 A1 * | 8/2016 | Kang | ........................ | H02J 7/04 |
| 2019/0056451 A1 * | 2/2019 | Asghari | .............. | H02J 7/00712 |
| 2020/0381925 A1 * | 12/2020 | Jelinek | ................... | H02J 3/381 |
| 2021/0175713 A1 * | 6/2021 | Wenzel | ................ | G01R 31/367 |
| 2021/0328432 A1 * | 10/2021 | Boulineau | ............. | H02J 7/0048 |
| 2022/0077707 A1 * | 3/2022 | Yan | ........................ | H02J 7/0048 |
| 2023/0261518 A1 * | 8/2023 | Das | .................. | H02J 13/00004 |
| | | | | 700/287 |

* cited by examiner

METHOD OF CONTROLLING OF BATTERY ENERGY STORAGE SYSTEM OF POWER SYSTEM WITH HIGH DYNAMIC LOADS

CROSS-REFERENCE TO RELATED APPLICATIONS

This patent application claims priority to European Patent Application No. 22163112.0, filed on Mar. 18, 2022, which is incorporated herein in its entirety by reference.

FIELD OF THE DISCLOSURE

The present disclosure relates to a method of controlling of battery energy storage system of power system with high dynamic loads. The method is suitable for power distribution grids and microgrids, which contain energy sources including sources of a renewable energy and dynamic and static loads as well as battery energy storage system. Battery energy storage system in such grids is designated to support energy distribution or energy flow of power system.

BACKGROUND OF THE INVENTION

In the state of the art there are known power distribution grids which contains traditional and renewable energy sources. Usage of energy storage systems becomes more and more frequent practice in such distribution grids. Power demand in power distribution grids must cover static loads and dynamic loads, so loads which demand high value of power in reality short periods of the time. Electric vehicle chargers, heating equipment, ventilation equipment, and cooling or air-conditioning equipment are examples of high dynamic loads operating with high peak powers for relatively short period of a time, which are nowadays especially common in power grids.

U.S. Pat. No. 9,954,368B2 discloses a battery energy storage system management device and method for managing a battery energy storage system. In this disclosure a power distribution system is equipped with battery energy storage system. The power is supplied through photovoltaic devices or turbines converting wind power energy into electrical energy. What is more the system is equipped with uninterruptible power supply. As a rule, the battery energy storage system is used to supply power flexibly. It is discharging charged power when power is required in the power distribution system. Detailly when the system is overloaded or when the system has high demand for power, the battery energy storage system discharges stored electrical energy. The battery energy storage system is used when the load in power distribution system is not satisfied with only the electrical energy supplied through solar or wind energy. Whereas when the power distribution system is lightly loaded, the battery energy storage system receives power form an electricity generation device or from the system and is charged. The battery energy storage system comprises a plurality of batter racks connected in parallel. The battery rack includes a plurality of modules connected in series and each of the plurality of modules includes a plurality of cells connected in series. The system for management has a measurement unit configured to measure state of charge of a plurality of series-connected modules or cells in the battery energy storage system. The measurement of state of charge might include measurement of voltage or current. There is also a power supply unit configured to supply power to one of the plurality of modules or one of the plurality of cells basis on the state of charge of the plurality of modules of cells. In the measurement of state of charge, it is determined whether the plurality of modules or plurality of cells included in each of the plurality of modules are within a reference range. It might be established whether one of a plurality of modules or cells show a voltage or current difference of more than a reference range size with respect to the plurality of other modules or cells. When state of charge of plurality of cells included in each of the plurality of modules are out of the reference rage, the power supply unit supplies power to the battery energy storage system. The power is supplied even if renewable energy power sources do not operate. In a such case the power is supplied to the battery energy storage system from the uninterruptible power supply. Such method of operation allows to efficiently manage the battery energy storage system and to extend its life cycle.

WO2017/062919A1 discloses a power supply system with a battery energy storage system which comprises method of operation that takes into account battery life model and is designated for university campus. Its main aim is to maintain stability of the grid frequency, especially at 60 Hz in the United States. Power supply system includes a common point of interconnection. It is the point at which campus grid, energy grid, photovoltaic panels power and a battery energy storage system are connected. The power outputs of the photovoltaic panels power and battery energy storage system combined at point of intersection form the power provided to power supply system. The campus grid is also connected to point of intersection; however it consumes a portion of the combined power to satisfy the energy requirements of the campus. Each of these parts can include a variety of necessary electrical circuit components configured to perform appropriate functions. What is more the power supply system includes a controller, which is configured to generate photovoltaic set points and the battery energy storage system set points. The battery energy storage system has also power inverter that uses the battery power setpoint to control an amount of charged power or discharged by the battery. The controller work depends on a variety of different variables including power signal from photovoltaic panels, a current state of charge of the battery energy storage system, a maximum battery power limit, a maximum power limit at point of interconnection, a ramp rate limit, the grid frequency and other variables that can be used by controller to perform ramp rate control and/or frequency regulation. What is more, the controller uses a battery life model to determine optimal battery power setpoints. Controller may include a battery degradation estimator configured to estimate an amount of battery degradation that will result from the used battery power setpoints. The controller may also use the battery life model to estimate a decrease in battery energy storage system capacity that will result from a planned or actual set of control outputs. The battery energy storage system power setpoint might be also adjusted basing on the estimated amount of the battery degradation. Besides the controller may use battery to perform ramp rate control. In such case controller may use energy form the battery energy storage system to smooth a sudden drop in power output so that the absolute value of the ramp rate is less that a threshold value. It might occur when a solar intensity disturbance occurs, such as a passing cloud blocking the sunlight to the photovoltaic panels. Controller may use energy from the battery energy storage system to make up the difference between the power provided by the photovoltaic panels and the minimum required power output to maintain the required ramp rate. The energy from the battery energy storage system allows the controller to gradually decrease power output so that the absolute value of the ramp rate does not exceed the threshold values. After sudden drop, the power output from photovoltaic panels returns to previous values. Therefore, the energy from the photovoltaic panels might be stored in the battery energy storage system. As an additional feature the controller might be configured to predict solar intensity disturbances using input form cloud detectors.

U.S. Pat. No. 9,618,914B2 discloses energy resource-grid-load automatic control system of a microgrid and control method thereof. The energy resource-grid-load automatic control system includes the microgrid with a distributed renewable energy power generation module, a distributed renewable energy inverter module, a conventional power generation module containing micro gas turbines, a user load module, a bidirectional power grid-connected control module, a distributed renewable energy intelligent optimizing power generation control module, a battery energy storage system, wherein the distributed renewable energy power generation module is used for converting solar energy, wind energy and biomass energy into electric energy and supplying power to loads or to power grid. The distributed renewable energy inverter module converts direct current discharged form photovoltaic panels, wind turbines and biomass energy power generation equipment into alternating current. The conventional power generation module is used for controlling micro gas turbines to supply power to the user loads or the power grid. The user load module is a local load in the microgrid. The bidirectional power grid-connected control module is used for controlling connection or disconnection and energy transfer between the microgrid and the power grid. The energy storage module is used for controlling the charging and discharging of a storage battery pack to ensure the average charging and discharging times of each storage battery.

The distributed renewable energy intelligent optimizing power generation control module realizes method of control and is used for:

acquiring nodal voltage and current of the photovoltaic panels, the wind turbines and the biomass energy power generation equipment, estimating the power generation capacity of the photovoltaic panels, the wind turbines and the biomass energy power generation equipment within 4 to 5 sampling periods by uncertainty estimation, plotting the forecast fluctuation curves of the power generation capacity, respectively calculating the robustness of the photovoltaic panels, the wind turbines and the biomass energy power generation equipment, and selecting the one with the best robustness to supply power to the user loads or the power grids;

sending a control signal to an intelligent energy storage unit adjuster when there is a difference between the actual power generation capacity of the photovoltaic panels, the wind turbines and the biomass energy power generation equipment and the total electric energy supplied to the user loads and the power grids; and sending control signals to micro gas turbine power generation controllers when the power generation capacity of the photovoltaic panels, the wind turbines and the biomass energy power generation equipment and the electric energy released from the energy storage module differ from the total electric energy required by the user loads and the power grids.

The energy storage module comprises also the intelligent energy storage unit adjuster and the storage battery pack, wherein if the remaining electric energy of the photovoltaic panels, the wind turbines and the biomass energy power generation equipment is received, the intelligent energy storage unit adjuster calculates the total charging and discharging times of each storage battery, then compares the result with the average of the total charging and discharging times of all storage batteries, and selects the storage battery with the largest difference for charging. If the power generation capacity of the photovoltaic panels, the wind turbines and the biomass energy power generation equipment cannot meet the needs of the user loads or the power grids, the intelligent energy storage unit adjuster receives a power generation control signal sent by a distributed renewable energy intelligent optimizing power generation controller to control the storage battery pack to discharge, calculates the total charging and discharging times of each storage battery, compares the result with the average of the total charging and discharging times of all storage batteries, and selects the storage battery with the largest difference for discharging; the storage battery pack is used for storing or releasing the remaining electric energy of the photovoltaic panels, the wind turbines and the biomass energy power generation equipment. The micro gas turbines are used for replenishing the user loads or the power grids with the electric energy generated by the micro gas turbines when the power generation capacity of the photovoltaic panels, the wind turbines and the biomass energy power generation equipment and the electric energy released from the energy storage module cannot meet the needs of the user loads or the power grids. The micro gas turbine power generation unit is used for supplying power to the user loads or the power grids. In this system control method of microgrid is used and it comprises steps of:

acquiring nodal voltage and current of the photovoltaic panels, the wind turbines and the biomass energy power generation equipment;

estimating the power generation capacity of the photovoltaic panels, the wind turbines and the biomass energy power generation equipment by uncertainty estimation, including resistance, reactance and photovoltaic nodal voltage;

plotting the forecast fluctuation curves of the power generation capacity according to the photovoltaic nodal voltage obtained earlier, with the time as the abscissa and the photovoltaic nodal voltage as the ordinate;

calculating the robustness of the power generation capacity of the photovoltaic panels, the wind turbines and the biomass energy power generation equipment, and selecting the one with the best robustness to supply power to the user loads or the power grids;

calculating the total electric energy supplied to the user loads and the power grids by the photovoltaic panels, the wind turbines and the biomass energy power generation equipment;

calculating the difference between the actual power generation capacity of the photovoltaic panels, the wind turbines and the biomass energy power generation equipment and the total electric energy supplied to the user loads and the power grids;

directly supplying power to the user loads and the power grids or storing the remaining electric energy of the photovoltaic panels, the wind turbines and the biomass energy power generation equipment into the energy storage module or replenishing the user loads and the power grids by discharging of the energy storage module;

calculating the difference wind energy between the actual power generation capacity of the photovoltaic panels, the wind turbines and the biomass energy power generation equipment and the total electric energy actually required by the user loads and the power grids and in case of such necessity replenishing the user loads and the power grids by the micro gas turbines.

Additionally, in this solution there is also provided a control method for charging and discharging of the energy storage. It comprises steps of:

establishing a neural network model according to the historical data of nodal voltage and current acquired at the user load ends to predict laws of power consumption of the user loads;

acquiring nodal voltage and current at the user load ends in real time by the state collectors, and continually correcting the neural network model; and releasing the total electric energy actually required by the user loads from the intelligent optimizing power consumption controller to the distributed renewable energy intelligent optimizing power generation controller according to the electric energy corrected, and starting the corresponding ones of the photovoltaic panels, the wind turbines, the biomass energy power generation equipment, the energy storage module and the conventional power generation module to supply power.

BRIEF SUMMARY OF THE INVENTION

The balancing of instantaneous active power in node of the grid is well known problem. The value of power consumed by loads and generated by different energy sources has to be equal all the time. Classic approach comprises main power source that is controlled by utility. Controller reacts on power demand changes having tabularised variation of load profile during a day, week, month or seasons.

Nowadays the development of power distribution systems in comparison with dynamically increasing number of high-power loads, like electric vehicle chargers, consuming high level of the energy in relatively short period of a time, requires a modernization, often by simple oversizing, of the power line by the grid operator. Frequently, to an electrical network beside a standard loads and number of high dynamic loads, like electric vehicle charging stations, other means of renewable, distributed energy sources are connected. Dynamic high-power loads and renewable sources make control of the grid power a complex task.

In case when high power loads are characterized by intermittent operation—the operating time of a device in relation to the idle time is relatively short, especially on one day time scale. The feeder line, switchgear, transformer and other devices must be dimensioned for the peak of load, which increases the cost of installation due to use of oversized components. Therefore, to ensure the correct operating conditions for other devices supplied from the same line, the short circuit level of the grid at the point of common coupling must be sufficiently high.

However, it is known in the state of the art, which overrating the components of the entire power system is not a good solution, neither from technical, nor economical or climate perspective. Therefore, it is also possible to bring into the service an energy storage system, especially battery energy storage system in small power scale. These devices are responsible for local grid balancing, ensuring the correct operating conditions in point of common coupling by power injecting into or receiving from the system in order to avoid exceed of power grid limits. Battery energy storage system additional functions could be related to compensation of power fluctuations caused by wind or solar energy generation as well. An economical aspect can be also considered— battery energy storage system could inject power to the grid when price of kWh is highest and charge itself when price of kWh is lowest.

Currently market is focusing on e-mobility growth. Specific infrastructure with energy storage modules dedicated for charging electrical vehicle gains market attention. This infrastructure is able to provide needed peak power capacity as well as back-up power for electric vehicle charging. Battery energy storage system provides significant support to the power grid. Moreover, the battery energy storage system can be utilized in several applications such as load levelling, load shifting, peak shaving and spinning reserve beyond others that becomes the state of art solutions.

Therefore, the battery energy storage system has a great importance for power grids. In order to prevent both system oversizing, and battery lifetime drop, an optimization of the battery energy storage systems usage should be provided, with simultaneous a strong focus on renewable, distributed energy sources and high dynamic loads.

The invention presents method of controlling of a battery energy storage system of power system with high dynamic loads wherein said power system comprises at least one renewable active power source, a battery energy storage system, at least one static load and at least one high dynamic load, wherein said system is connected in single point of common coupling to the external power grid, and the method includes steps of predicting the power generation capacity of at least one renewable active power source and predicting loads in said system based on historical data for optimizing power supply and lifetime of the battery energy storage system. The essence of the invention is that active power demand of the system in point of common coupling being at quasi-constant level and said method of controlling of battery energy storage system comprises following steps of:

gathering constant active power limit from the external grid ($P_{GRID}$) and historical data of active power profiles of:

$P_{R(day)}$—active power from renewable active power sources during 24 h period $P_{H.LOAD(day)}$—active power demand from high dynamic loads during 24 h period $P_{Load(day)}$—active power demand from static load during 24 h period predicting the following active power profiles for day+1:

$P_{R(day+1)}$—active power from renewable active power sources during next 24 h period $P_{H.LOAD(day+1)}$—active power demand from high dynamic loads during next 24 h period $P_{Load(day+1)}$—active power demand from static load during next 24 h period calculating required active power of the battery energy storage system (BESS) according to following formula:

$$P_{BESS}=P_{R(day+1)}+P_{GRID}-P_{LOAD(day+1)}-P_{H.LOAD(day+1)}$$

wherein:

$P_{BESS}$—required active power of the battery energy storage system.

$P_{R(day+1)}$—predicted active power from renewable active power sources.

$P_{GRID}$—constant active power limit from the external grid $P_{LOAD(day+1)}$—predicted active power demand from high dynamic loads.

$P_{H.LOAD(day+1)}$—predicted active power demand from high dynamic loads.

setting daily peak of state of charge and minimum state of charge of the battery energy storage system corresponding to capacity of the battery energy storage system that ensures required active power of the battery energy storage system calculated in the previous step, verifying if set daily peak of state of charge and minimum state of charge ensures that instantaneous values of state of charge through the entire day of the battery energy storage system is within range of 20% to 80%, having the battery energy storage system rating and profiles of $P_{LOAD(day+1)}$, $P_{H.LOAD(day+1)}$, $P_{R(day+1)}$, If yes, the daily peak of state of charge and minimum state of charge of the battery energy storage system (BESS) is properly set, If no, the daily peak of state of charge and minimum state of charge must be raised or lowered and then the calculation of required active power of the battery energy storage system (BESS) and subsequent steps must be repeated.

It is also beneficial when that depth of discharge of the battery energy storage system corresponds to the calculated required active power of the battery energy storage system. The average state of charge of the battery energy storage system may be in the range of 20% to 60%. Beneficially, the battery energy storage system charging and discharging sessions are predicted in step of predicting of the active power profiles for day+1.

The battery energy storage system is charged with surplus energy generated by renewable power sources when is a lack of load. Usefully, the battery energy storage system supports operation of at least one high dynamic load when price of the energy during a day is high and charge itself to store energy when price of the energy during a day is low.

In one embodiment, at least one high dynamic load is an electric vehicle charger. Usefully, the steps of the method being performed by means of a processing employing artificial intelligence and/or machine learning techniques and/or at least one trained algorithm. The object of the invention is also a computer program comprising means of program code for performing all steps of the method according, when the said program is running on the computer.

The present disclosure applies to software and also a control unit configured to execute the steps of the method. The application of the present disclosure also extends to power system with high dynamic loads for connecting to the external power grid in one point of common coupling comprising at least one renewable active power source, a battery energy storage system, at least one static load, at least one high dynamic load and a control unit.

In one embodiment, when microgrid is built or is under development a machine learning and historical data concerning:

battery energy storage system (BESS) charging and discharging profiles, active power from renewable active power sources during 24 h period active power demand from high dynamic loads active power demand from static load during 24 h period are used and/or previously measured, to determine capacity of microgrid components.

BRIEF DESCRIPTION OF THE SEVERAL VIEWS OF THE DRAWING(S)

DETAILED DESCRIPTION OF THE INVENTION

Figure 1:
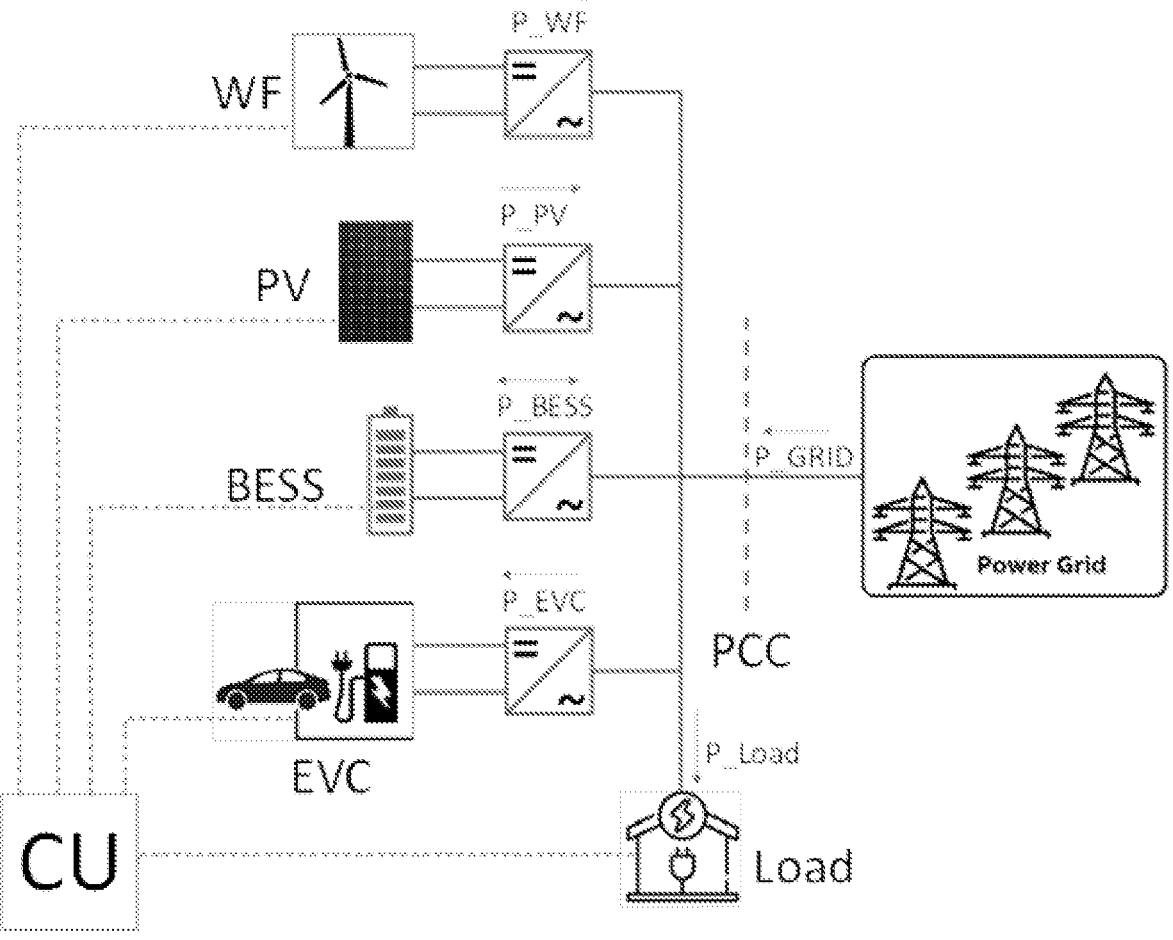
FIG. 1 is a schematic of a power grid system with possible directions of active power flow in accordance with the disclosure.
Figure 2:
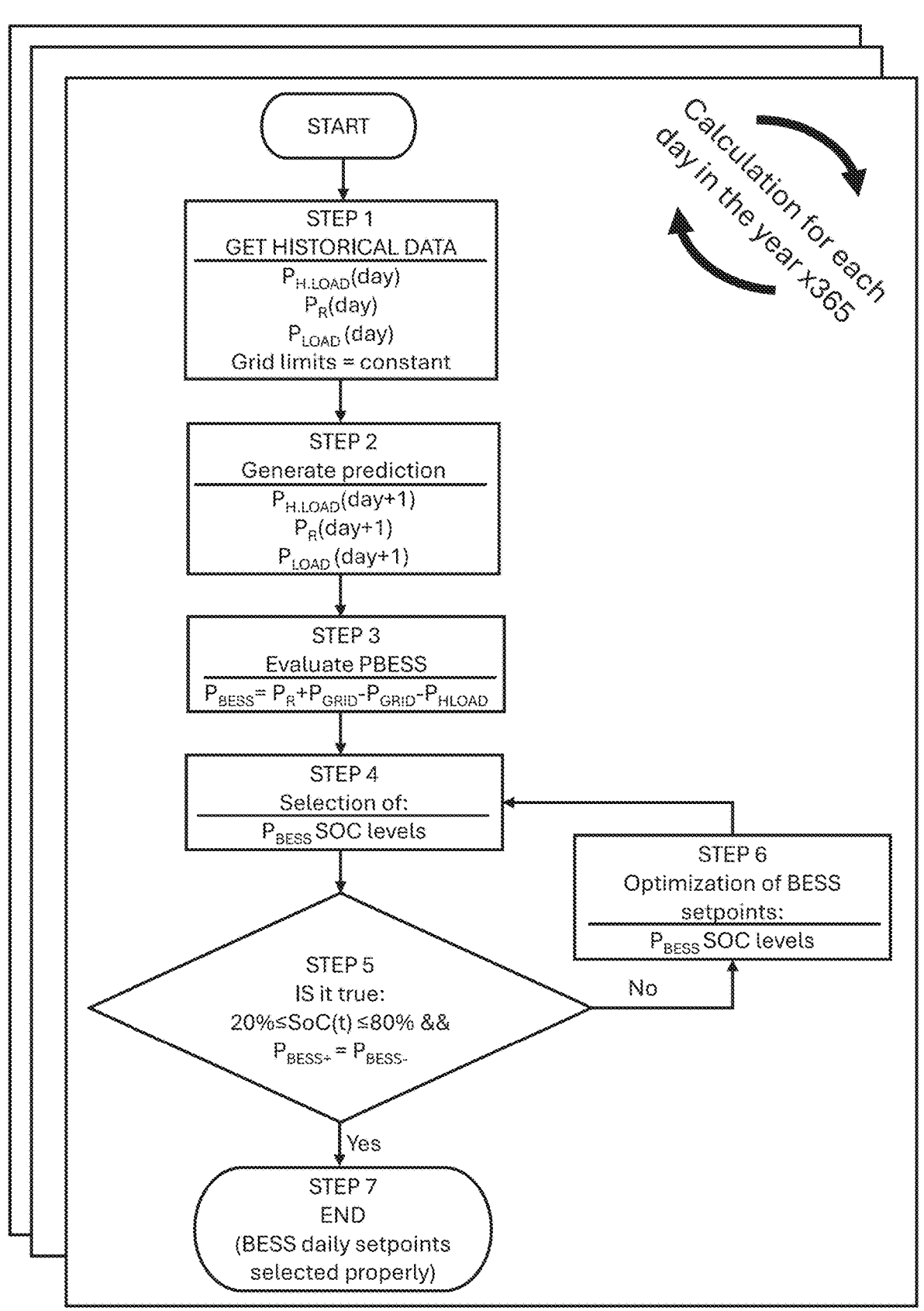
FIG. 2 is a flowchart for a method in accordance with the disclosure.

The present disclosure describes a method of controlling of battery energy storage system. A first embodiment is described hereinbelow. A power system comprises a microgrid which is isolated and connected in single point of common coupling PCC with an external power grid. The microgrid includes two renewable active power sources $P_R$, namely photovoltaic panels PV and wind turbines WF. Power generation from renewable active power sources is dependent on rapidly changing environmental conditions, namely Sun's irradiance for photovoltaic panels PV, and wind speed for wind turbines WF. Therefore, they are characterized as hard to predict high dynamic sources.

In the microgrid there are also a battery energy storage system BESS, static loads and high dynamic loads. Static loads are understood as typical loads form users of microgrid, like loads in a household. These static loads are quite predictable and are well recognized in the state of the art. Whereas high dynamic loads are characterized by intermittent operation. On the one-day time scale, encompassing 24 h, the operating time of a device in relation to the idle time is relatively short. Electric vehicle chargers EVC are very good example of high dynamic loads, but such high dynamic loads might be also generated by the heating, ventilation, and air conditioning devices or lighting. Electric vehicle chargers EVC in case of commercial vehicles operates with peak power close to even 350 kW for relatively short period of a time. For example, Porsche Taycan or Audi eTron GT is charging from minimum to 80% with peak power up to 270 kW, and it takes around 23 minutes. However, high power equal to 270 kW is used only for approximately 10 min. Charging from 80% to 100% takes another hour and power is lower than 50 kW during this time.

The power system is equipped with electrical appliances, which are responsible for power conversion DC to AC and AC to DC depending on purpose, steering devices and/or electrical safety devices. The power system is also equipped with a control unit CU which is connected with all components of the power system. The control unit CU is configured to execute all steps of the method of controlling of battery energy storage system BESS.

In the power system it is assumed that energy stored in battery energy storage system BESS is sufficient to cover excessive active power demand from any dynamic loads like electric vehicle chargers EVC. Thus, the following equations that lead to this can be pointed out for an instantaneous power equality condition:

$$P_{PV}+P_{WF}-P_{LOAD}-P_{EVC}\pm P_{BESS}=P_{GRID}$$

This equation could also be presented as:

$$P_R-P_{LOAD}-P_{H.LOAD}\pm P_{BESS}=P_{GRID}$$

For an energy equality condition:

$$E_{PV}+E_{WF}+E_{GRID}-E_{LOAD}-E_{EVC}=0$$

$$E_{PV}+E_{WF}+E_{GRID}=\Delta E_{BESS+}$$

$$E_{LOAD}+E_{EVC}=\Delta E_{BESS-}$$

$$\Delta E_{BESS+}=\Delta E_{BESS-}$$

This equation could also be presented as:

$$E_R+E_{GRID}-E_{LOAD}-E_{H.LOAD}=0$$

$$E_R+E_{GRID}=\Delta E_{BESS+}$$

$$E_{LOAD}+E_{H.LOAD}=\Delta E_{BESS-}$$

$$\Delta E_{BESS+}=\Delta E_{BESS-}$$

Where:

$P_{GRID}$—active power from external power grid $P_R$—active power from renewable active power sources $P_{PV}$—active power from photovoltaic power plant $P_{WF}$—active power from wind turbine $P_{BESS}$—active power charged to and discharged from BESS.

$P_{EVC}$—active power demand from electric vehicle charger EVC $P_{LOAD}$—active power demand from static load $P_{H.LOAD}$—active power demand from high dynamic load In the microgrid of the power system active power demand of the system in single point of common coupling power has been established at quasi-constant level and following steps has been used for controlling of the battery energy storage system BESS of the power system:

gathering 10 constant active power limit from the external grid $P_{GRID}$ and historical data of active power profiles of:

$P_{R(day)}$—active power from renewable active power sources during 24 h period $P_{H.LOAD(day)}$—active power demand from high dynamic loads during 24 h period $P_{Load(day)}$—active power demand from static load during 24 h period predicting 20 the following active power profiles for day+1:

$P_{R(day+1)}$—active power from renewable active power sources during next 24 h period $P_{H.LOAD(day+1)}$—active power demand from high dynamic loads during next 24 h period $P_{Load(day+1)}$—active power demand from static load during next 24 h period calculating 30 required active power of the battery energy storage system BESS according to following formula:

$$P_{BESS}=P_{R(day+1)}+P_{GRID}-P_{LOAD(day+1)}-P_{H.LOAD(day+1)}$$

wherein:

$P_{BESS}$—required active power of the battery energy storage system.

$P_{R(day+1)}$—predicted active power from renewable active power sources.

$P_{GRID}$—active power limit from the external grid $P_{LOAD(day+1)}$—predicted active power demand from high dynamic loads.

$P_{H.LOAD(day+1)}$—predicted active power demand from high dynamic loads.

setting 40 daily peak of state of charge SoC and minimum state of charge SoC of the battery energy storage system BESS corresponding to capacity of the battery energy storage system BESS that ensures required active power of the battery energy storage system BESS calculated in the previous step, verifying 50 if set daily peak of state of charge SoC and minimum state of charge SoC ensures that instantaneous value of state of charge SoC through the entire day of the battery energy storage system BESS is within range of 20% to 80%, having the battery energy storage system BESS rating, and profiles of $P_{LOAD(day+1)}$, $P_{H.LOAD(day+1)}$, $P_{R(day+1)}$, If yes, the daily peak of state of charge SoC and minimum state of charge SoC of the battery energy storage system BESS is properly set, If no, the daily peak of state of charge SoC and minimum state of charge SoC must be raised or lowered and then the calculation of required active power of the battery energy storage system BESS and subsequent steps must be repeated.

Following state of charge SoC of the battery energy storage system BESS has been established for the subsequent days taking into account battery depth of discharge DoD. The schedule for the battery energy storage system BESS daily peak of state of charge SoC and minimum state of charge SoC for consecutive days could look as follows:

| | Required active power of the BESS - as % of DoD | Daily peak SoC | Minimum SoC |
|---|---|---|---|
| Day (1) | 60% | 80% | 20% |
| Day (2) | 50% | 75% | 25% |
| Day (3) | 40% | 70% | 30% |
| . . . | | | |
| Day (n)* | 20% | 50% | 30% |
| Day (n + 1) | 55% | 80% | 25% |

*n - integer consecutive number

Therefore, daily peak of state of charge SoC and minimum state of charge SoC in the battery energy storage system BESS are set according to the method. Minimum state of charge SoC might occur as an initial state of charge SoC of the battery energy storage system BESS at the beginning of 24 h period. Minimum state of charge SoC might be also at the end of 24 h period or when power demand from electric vehicle charger EVC has been stopped. The daily peak of state of charge SoC of the battery energy storage system BESS it the maximum level of state of charge SoC during 24 h period, it might occur for example exactly just before a usage of high dynamic load is predicted.

Set levels of daily peak of state of charge SoC and minimum state of charge SoC are also verified 50 in order to ensure that instantaneous value of state of charge SoC through the entire day of the battery energy storage system BESS is within range of 20% to 80%. It is necessary to avoid unfavorable circumstances which are detrimental for battery life span, for example when because of extraordinary occurrence minimum state of charge SoC of the battery energy storage system BESS will occur during continuous use of electric vehicle charger EVC. In such case the battery energy storage system BESS performance rapidly deteriorates. So verification 50 allows to exclude these circumstances.

Figure 3:
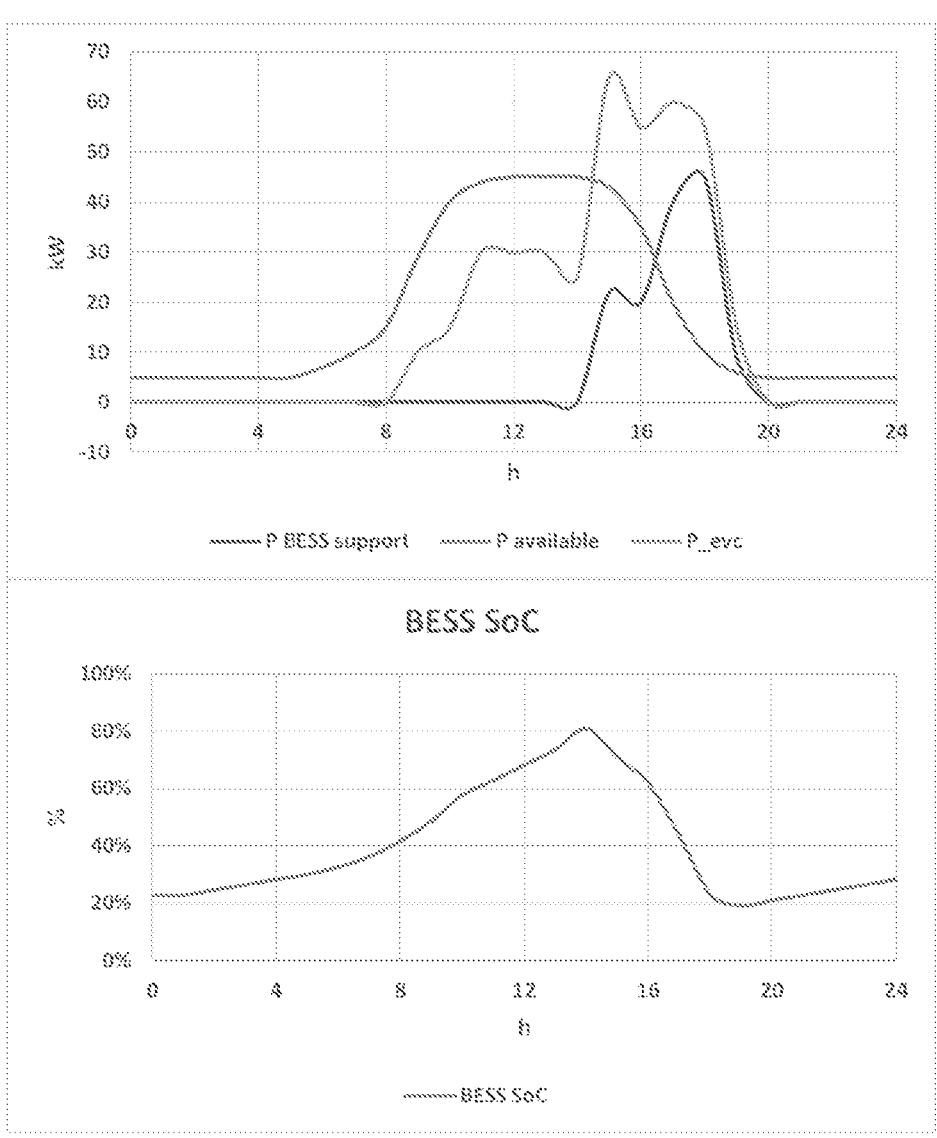
FIG. 3 is a chart with 24-h active power flow, and battery energy storage system state of charge, where battery is optimally charged, in accordance with the disclosure.

What is more, provided method has been used for controlling microgrid as described above. 24 h power flow chart has been drawn up (FIG. 3). It presents active power profiles from renewable active power sources $P_R$, active power demand from electric vehicle charger EVC, and finally active power delivered by battery energy storage system BESS. Active power demand from electric vehicle charger EVC exceeds available active power from the renewable active power sources $P_R$, hence battery energy storage system BESS must cover missing demand. In this case:

battery energy storage system BESS is charged during the day up to 80% state of charge;

this level of state of charge allows to fully cover electric vehicle charger EVC active power demand;

at the end of the day, remaining battery energy storage system BESS state of charge is still at 20%;

and from the lifetime perspective, optimal state of charge for battery energy storage system BESS is between 20% and 80% and this state of charge is maintained.

Figure 4:
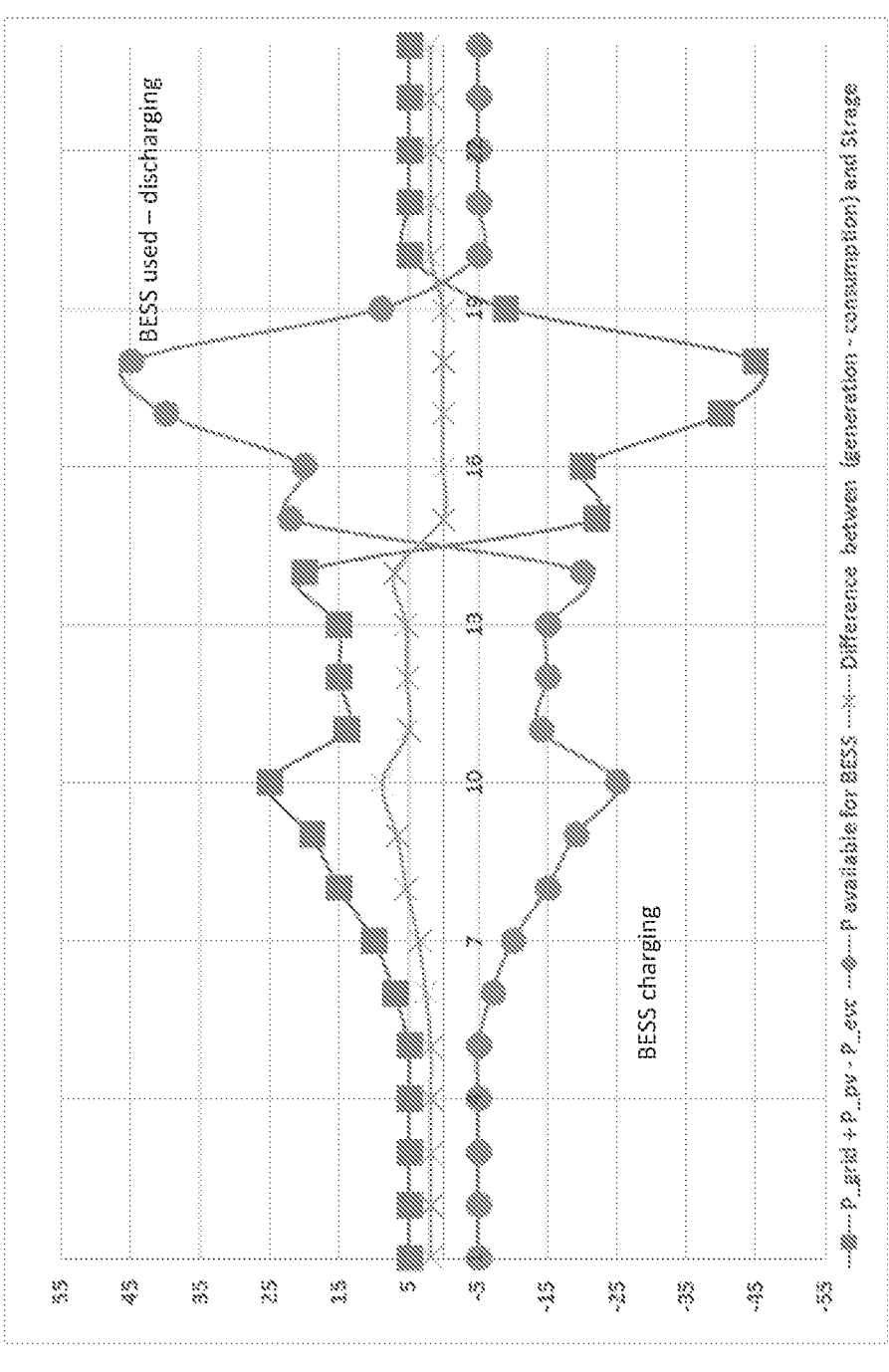
FIG. 4 is a chart with battery energy storage system work in accordance with the disclosure.

Further illustrating charts might be created. During a full day, the battery energy storage system BESS works only with part of available power in order to achieve state of charge between 20% and 80% (FIG. 4).

Preferably, the average state of charge SoC of the battery energy storage system BESS during whole period 24 h is in the range of 20% to 60%.

It is also preferred when the battery energy storage system BESS is charged with surplus energy generated by renewable power sources when is a lack of load.

In method of controlling the battery energy storage system BESS historical data has been used. Prediction of energy flow has been used as shown in energy equality conditions. This prediction has been done based on historical data and earlier prediction of loads and power sources. What is more, in historical data weather forecasts have been also taken into account. Steps of the method has been performed by means of a processing employing artificial intelligence. Further use of a machine learning techniques and/or at least one trained algorithm is possible. There are no limitations as far as scope of gathering or analyzing of historical data. Historical data might cover any period, in which 24 h period is considered as a period base. Hence historical data might be consisting of one hundred of 24 h periods or three hundred and sixty-five of 24 h periods. Historical data might also consist of any number of 24 h periods which are possible to register. It is favorable for artificial intelligence and/or machine learning because bigger scope of historical data enables better predictions.

In an alternative (second) embodiment, the method of controlling the battery energy storage system BESS is identical to the first embodiment, except that that depth of discharge DoD of the battery energy storage system BESS corresponds to the calculated required active power of the battery energy storage system BESS.

In an additional (third) embodiment, the method of controlling the battery energy storage system BESS is identical to the first embodiment, except that the battery energy storage system BESS charging and discharging sessions are also predicted in step of predicting 20 of the active power profiles for day+1. Therefore, artificial intelligence provides better utilization of all parts of the power system. Typical operation of the battery energy storage system BESS is additionally boosted by prediction of operation intervals—charging and discharging sessions.

In this embodiment, in order to consider financial aspects of the power system the battery energy storage system BESS supports operation of at least one high dynamic load, namely electric vehicle charger EVC when price of the energy during a day is high. While charging of the battery energy storage system BESS in order to store energy is realized when price of the energy during a day is low. Consequently, the battery energy storage system BESS injects power to the microgrid when price of kWh is highest and charge itself when price of kWh is lowest.

In an additional (fourth) embodiment, the method of controlling the battery energy storage system BESS is identical to the first embodiment. However, in this embodiment, this method has been used to develop the power system. Machine learning and historical data concerning:

battery energy storage system BESS charging and discharging profiles, active power from renewable active power sources during 24 h day period active power demand from high dynamic loads active power demand from static load during 24 h day period have been used to determine capacity of the microgrid components.

In other aspects, the present disclosure can be implemented as a computer program for performing all steps of the method. A computer program has been used to perform all steps of the method of controlling the battery energy storage system BESS. The computer program is running on the computer and is comprising means of program code for performing all steps of the method. A computer-readable medium storing computer-implemented instructions performing all steps of the method of controlling the battery energy storage system BESS has been implemented on the computer.

Main advantages of these embodiments are prevention of excessive oversizing of the power system components as well as extension of a battery energy storage system lifetime. Proper charging level of the battery energy storage system allows to define optimal state of charge levels and provide sufficient active power to cover entire day energy demand from static and high dynamic loads. It is possible to avoid disadvantages associated with extreme state of charges, i.e., when the battery is discharged or works with state of charge between 0% and 20% as well as when the battery is overcharged and when it is charged over 80% and over predicted demand. Such extreme state of charges leads to deterioration of battery lifetime.

Additionally, properly sized ratings of renewable active power sources as well as the battery energy storage system allows to run power system with quasi-constant active power received from the external power grid. The power system is meant as a microgrid. Thanks to this also the power system is a stable energy consumer from the external power grid. It is especially important because in the external power grid, energy usually comes from conventional energy sources. What is more power required from the external power grid to the power system at quasi-constant level can be significantly lower than resulting from load demand. Hence the power system is charged from the power grid with quasi-constant low power, which does not exceed maximum power.

Power generated by renewable active power sources are balanced in the power system by the battery energy storage system. Consequently, it is not necessary to establish bidirectional point of common coupling. Energy from the power system is not directed to the power grid.

Furthermore, all power system components can be optimally sized and utilized. Historical data and use of a machine learning and an artificial intelligence used in the inventions provide better utilization of all systems. Typical operation of the battery energy storage system is additionally boosted by prediction of operation intervals—charging and discharging sessions.

The present disclosure allows to decrease cost of installation especially in long-time perspective, due to a lifetime extension of batteries used in the battery energy storage system. Additionally, solution meets requirements of growing popularity of electric vehicles because electric vehicle chargers are part of the power system and high dynamic loads coming from them are satisfied in this power system. If such applications power system components don't need to be oversized to withstand high active power momentary peaks. Furthermore, it possible to use full power of high dynamic loads, for example full charging possibilities of electric vehicle chargers. Power of devices generating high dynamic loads is not limited by maximum power available in point of common coupling. Excessive power demands from high dynamic loads are satisfied by the battery energy storage system.

The embodiments described herein present an eco-friendly solution due to reduced sizing of components and prolonged life span. It allows also for energy cost optimization, because when price during a day is high the battery energy storage system supports operation of high dynamic loads, particularly electric vehicle chargers, otherwise the battery energy storage system will start charging to store energy.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling of battery energy storage system of power system with high dynamic loads, wherein said power system comprises at least one renewable active power source, a battery energy storage system (BESS), at least one static load and at least one high dynamic load, wherein said system is connected in a single point of common coupling to the external power grid, and the method comprises:

predicting the power generation capacity of at least one renewable active power source and predicting loads in said system based on historical data for optimizing power supply and lifetime of the battery energy storage system;

active power demand of the system in the point of common coupling being at quasi-constant level;

controlling the battery energy storage system by:

gathering (10) constant active power limit from the external grid ($P_{GRID}$) and historical data of active power profiles of:

$P_{R(day)}$—active power from renewable active power sources during 24 h period, $P_{H.LOAD(day)}$—active power demand from high dynamic loads during 24 h period, $P_{Load(day)}$—active power demand from static load during 24 h period, predicting the following active power profiles for day+1:

$P_{R(day+1)}$—active power from renewable active power sources during next 24 h period, $P_{H.LOAD(day+1)}$—active power demand from high dynamic loads during next 24 h period, $P_{Load(day+1)}$—active power demand from static load during next 24 h period, calculating (30) required active power of the battery energy storage system (BESS) according to following formula:

$$P_{BESS} = P_{R(day+1)} + P_{GRID} - P_{LOAD(day+1)} - P_{H.LOAD(day+1)}$$

wherein:

$P_{BESS}$—required active power of the battery energy storage system $P_{R(day+1)}$—predicted active power from renewable active power sources, $P_{GRID}$—constant active power limit from the external grid, $P_{LOAD(day+1)}$—predicted active power demand from high dynamic loads, $P_{H.LOAD(day+1)}$—predicted active power demand from high dynamic loads, setting daily peak of state of charge (SoC) and minimum state of charge (SoC) of the battery energy storage system (BESS) corresponding to capacity of the battery energy storage system that ensures required active power of the battery energy storage system (BESS) calculated in the previous step, verifying if set daily peak of state of charge (SoC) and minimum state of charge (SoC) ensure that instantaneous values of state of charge (Soc) through the entire day of the battery energy storage system (BESS) is within range of 20% to 80%, having the battery energy storage system (BESS) rating, and profiles of $P_{LOAD(day+1)}$, $P_{H.LOAD(day+1)}$ $P_{R(day+1)}$, when yes, the daily peak of state of charge (SoC) and minimum state of charge (SoC) of the battery energy storage system (BESS) is properly set, when no, the daily peak of state of charge (SoC) and minimum state of charge (SoC) must be raised or lowered and then the calculation of required active power of the battery energy storage system (BESS) and subsequent steps must be repeated.

2. The method according to claim 1, wherein a depth of discharge (DoD) of the battery energy storage system (BESS) corresponds to the calculated required active power of the battery energy storage system (BESS).

3. The method according to claim 1, wherein an average state of charge (SoC) of the battery energy storage system (BESS) is in the range of 20% to 60%.

4. The method according to claim 1, wherein battery energy storage system (BESS) charging and discharging sessions are predicted when predicting the active power profiles for day+1.

5. The method according to claim 1, wherein the battery energy storage system (BESS) is charged with surplus energy generated by renewable power sources when is a lack of load.

6. The method according to claim 4, wherein the battery energy storage system (BESS) supports operation of at least one high dynamic load when price of the energy during a day is high and charge itself to store energy when price of the energy during a day is low.

7. The method according to claim 1, wherein the at least one high dynamic load is an electric vehicle charger.

8. The method according to claim 1, wherein the steps of the method being performed by means of a processing employing artificial intelligence and/or machine learning techniques and/or at least one trained algorithm.

9. The method according to claim 1, wherein when microgrid is built or is under development machine learning and historical data concerning:

battery energy storage system (BESS) charging and discharging profiles, active power from renewable active power sources during 24 h day period, active power demand from high dynamic loads, active power demand from static load during 24 h day period, are used and/or previously measured, to determine capacity of microgrid components.

* * * * *